United States Patent
Garcia-Crespo et al.

(10) Patent No.: US 9,435,268 B2
(45) Date of Patent: Sep. 6, 2016

(54) METHODS OF SI BASED CERAMIC COMPONENTS VOLATILIZATION CONTROL IN A GAS TURBINE ENGINE

(71) Applicant: General Electric Company, Schenectady, NY (US)

(72) Inventors: Andres Jose Garcia-Crespo, Greenville, SC (US); John Delvaux, Greenville, SC (US); Noemie Dion Ouellet, Greenville, SC (US)

(73) Assignee: General Electric Company, Schenectady, NY (US)

( * ) Notice: Subject to any disclaimer, the term of this patent is extended or adjusted under 35 U.S.C. 154(b) by 382 days.

(21) Appl. No.: 14/222,927

(22) Filed: Mar. 24, 2014

(65) Prior Publication Data

US 2015/0267621 A1 Sep. 24, 2015

(51) Int. Cl.
*F02C 9/40* (2006.01)
*F01D 5/28* (2006.01)

(52) U.S. Cl.
CPC .............. *F02C 9/40* (2013.01); *F01D 5/288* (2013.01); *F05D 2270/11* (2013.01); *Y02T 50/672* (2013.01)

(58) Field of Classification Search
CPC combination set(s) only.
See application file for complete search history.

(56) References Cited

U.S. PATENT DOCUMENTS

| 5,298,587 | A | * | 3/1994 | Hu | C23C 16/30 427/489 |
|---|---|---|---|---|---|
| 5,561,977 | A | | 10/1996 | Harada et al. | |
| 6,045,877 | A | * | 4/2000 | Gleason | B05D 1/60 427/255.18 |
| 6,517,341 | B1 | | 2/2003 | Brun et al. | |
| 8,123,821 | B2 | | 2/2012 | Gilmurray | |
| 2005/0238888 | A1 | | 10/2005 | Spitsberg et al. | |

FOREIGN PATENT DOCUMENTS

| EP | 2236774 A2 | 10/2010 |
|---|---|---|
| EP | 2375235 A1 | 10/2011 |
| WO | 2010134918 A1 | 11/2010 |

OTHER PUBLICATIONS

European Search Report and Opinion issued in connection with corresponding EP Application No. 15160117.6 on Jul. 24, 2015.

* cited by examiner

*Primary Examiner* — David Walczak
(74) *Attorney, Agent, or Firm* — Nixon & Vanderhye P.C.

(57) ABSTRACT

A method of controlling volatilization of silicon based components in a gas turbine engine includes measuring, estimating and/or predicting a variable related to operation of the gas turbine engine; correlating the variable to determine an amount of silicon to control volatilization of the silicon based components in the gas turbine engine; and injecting silicon into the gas turbine engine to control volatilization of the silicon based components. A gas turbine with a compressor, combustion system, turbine section and silicon injection system may be controlled by a controller that implements the control method.

20 Claims, 6 Drawing Sheets

METHODS OF SI BASED CERAMIC COMPONENTS VOLATILIZATION CONTROL IN A GAS TURBINE ENGINE

This invention was performed under a United States government contract with the Department of Energy, contract number DE-FC26-05NT42643. The Government may have certain rights in the invention.

BACKGROUND OF THE INVENTION

The subject matter disclosed herein relates to a method and system for controlling volatilization of silicon in a gas turbine engine. The subject matter disclosed herein relates particularly to a method and system for injecting silicon into a gas turbine engine to control volatilization of silicon components.

Ceramic components are the next generation of materials that will enable higher gas turbine efficiencies to be achieved. The main issue with the application of ceramic components in gas turbines is the recession due to hot water vapor present in the flow path of the engine. This recession makes the parts susceptible to failure long before the required service interval.

Environmental Bather Coatings (EBCs) have been applied to silicon ceramic components to allow them to survive in hot and water vapor prone environments. EBCs, which coat the silicon ceramic component, encase the component and effectively seal the component from any water vapor ingestion. This prevents recession on the part. The ceramic components' life depends on the proper function of the EBC during a component service interval. At the service interval the original EBC may be removed a new EBC applied. If the EBC is compromised while the ceramic component is in service, then the life of the ceramic component may be compromised.

U.S. Pat. No. 6,517,341 discusses gas turbine components that can be made from silicon based ceramics, the process why which silicon based ceramic components may erode, and reducing material loss of silicon-containing ceramics and silicon-containing ceramic composites in a combustion gas environment by injecting an effective amount of silicon into said combustion gas environment. However, the method described in U.S. Pat. No. 6,517,341 does not recognize all of the aspects necessary to effectively determine and apply an effective amount of silicon.

For the foregoing reasons, there may be a desire for a new and improved method and system for controlling volatilization of silicon in a gas turbine engine.

BRIEF DESCRIPTION OF THE INVENTION

Aspects of the system and method of controlling volatilization of silicon based components in a gas turbine engine described herein provide solutions to one or more problems or disadvantages associated with the prior art.

In one exemplary but non-limiting aspect, the present disclosure relates to a method of controlling volatilization of silicon based components in a gas turbine engine. The method comprises measuring, estimating and/or predicting a variable related to operation of the gas turbine engine; correlating the variable to determine an effective amount of silicon to control volatilization of the silicon based components in the gas turbine engine; comparing the effective amount of silicon to a maximum amount of silicon; and injecting the lesser of the effective amount of silicon and the maximum amount of silicon into the gas turbine engine to control volatilization of the silicon based components.

In another exemplary but non-limiting aspect, the present disclosure relates to a method of controlling volatilization of silicon based components in a gas turbine engine. The method comprises measuring temperature of turbine exhaust gas, fuel flow, water content of the turbine exhaust gas, and a component temperature of the gas turbine engine; correlating each of the temperature of the turbine exhaust gas, the fuel flow, the water content and the component temperature to determine an effective amount of silicon to control volatilization of the silicon based components in the gas turbine engine; and injecting the effective amount of silicon into the gas turbine engine to control volatilization of the silicon based components.

In another exemplary but non-limiting aspect, the present disclosure relates to a gas turbine system. The gas turbine system comprises a compressor; a combustion system; a turbine section; an injector adapted to inject silicon into the combustion system; and a controller. The controller includes programming for measuring, estimating and/or predicting a variable related to operation of the gas turbine engine; correlating the variable to determine an effective amount of silicon to control volatilization of the silicon based components in the gas turbine engine; comparing the effective amount of silicon to a maximum amount of silicon; and injecting the lesser of the effective amount of silicon and the maximum amount of silicon into the gas turbine engine to control volatilization of the silicon based components.

DETAILED DESCRIPTION OF THE INVENTION

Figure 1:
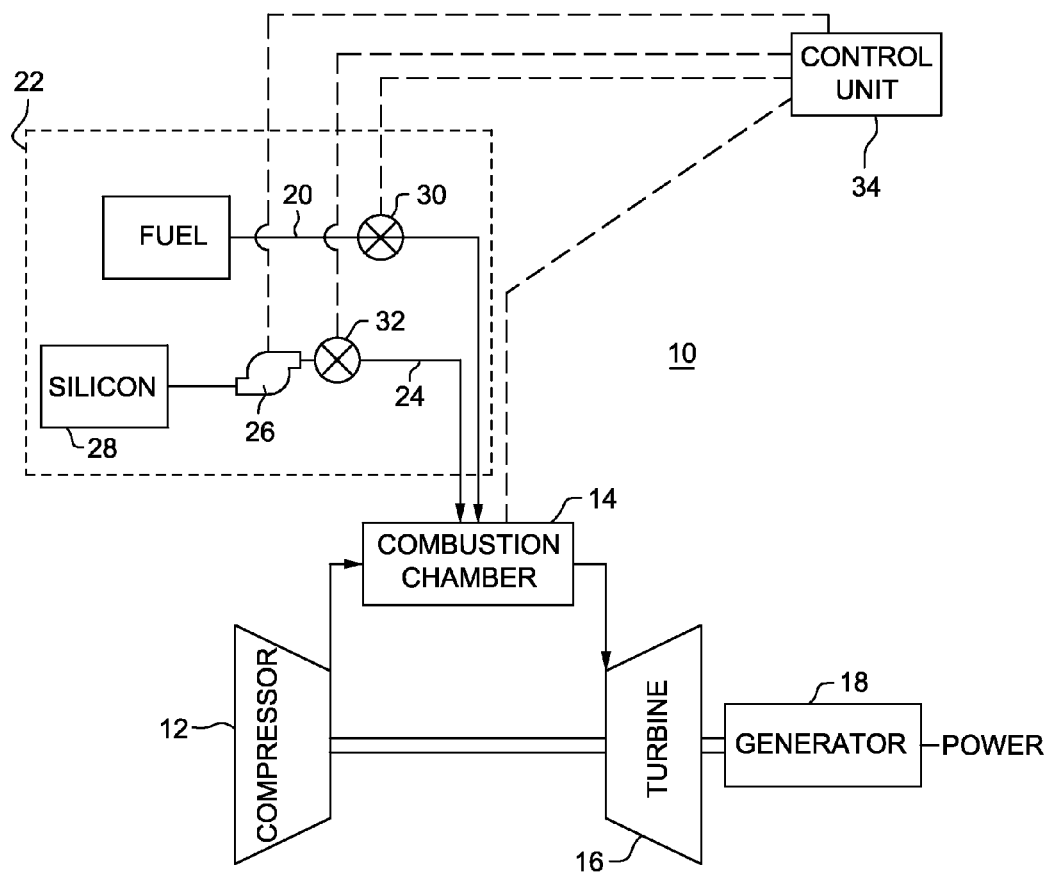
FIG. 1 is an exemplary but non-limiting schematic diagram of a gas turbine engine with silicon injection.

One or more specific embodiments of the present disclosure will be described below. In an effort to provide a concise description of these embodiments, all features of an actual implementation may not be described in the specification. It should be appreciated that in the development of any such actual implementation, as in an engineering or design project, numerous implementation-specific decisions are made to achieve the specific goals, such as compliance with system-related and/or business-related constraints, which may vary from one implementation to another. Moreover, it should be appreciated that such effort might be complex and time consuming, but would nevertheless be a routine undertaking of design, fabrication, and manufacture for those of ordinary skill having the benefit of this disclosure.

Detailed example embodiments are disclosed herein. However, specific structural and functional details disclosed herein are merely representative for purposes of describing example embodiments. Embodiments of the present disclosure may, however, be embodied in many alternate forms, and should not be construed as limited to only the embodiments set forth herein.

Accordingly, while example embodiments are capable of various modifications and alternative forms, embodiments thereof are illustrated by way of example in the figures and will herein be described in detail. It should be understood, however, that there is no intent to limit example embodiments to the particular forms disclosed, but to the contrary, example embodiments are to cover all modifications, equivalents, and alternatives falling within the scope of the present disclosure.

The terminology used herein is for describing particular embodiments only and is not intended to be limiting of example embodiments. As used herein, the singular forms "a", "an" and "the" are intended to include the plural forms as well, unless the context clearly indicates otherwise. The terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Although the terms first, second, etc. may be used herein to describe various elements, these elements should not be limited by these terms. These terms are only used to distinguish one element from another. For example, but not limiting to, a first element could be termed a second element, and, similarly, a second element could be termed a first element, without departing from the scope of example embodiments. As used herein, the term "and/or" includes any, and all, combinations of one or more of the associated listed items.

Certain terminology may be used herein for the convenience of the reader only and is not to be taken as a limitation on the scope of the invention. For example, words such as "left", "right", "horizontal", "vertical", "downstream", "forward", and the like; merely describe the configuration shown in the figures. Indeed, the element or elements of an embodiment of the present disclosure may be oriented in any direction and the terminology, therefore, should be understood as encompassing such variations unless specified otherwise.

As used throughout the specification and claims, "substantially" includes at least deviations from ideal or nominal values that are within manufacturing, operational and/or inspection tolerances. As used throughout the specification, estimating is in reference to a current value and predicting is in reference to a future value.

The present disclosure may be applied to the variety of gas turbine engines that compress an ingested air, such as, but not limiting of, a heavy-duty gas turbine; an aeroderivative gas turbine; or the like. An embodiment of the present disclosure may be applied to either a single gas turbine engine or a plurality of gas turbine engines. An embodiment of the present disclosure may be applied to a gas turbine engine operating in a simple cycle or combined cycle.

The present disclosure details a way to control and operate a gas turbine engine, which may be included in a power plant, with silicon doping. The silicon doping may be part of the main fuel system. The silicon doping may also be separate from the main fuel system so long as the silicon is provided to an appropriate location within the gas turbine engine. This silicon doping is done to slow down the recession of ceramic materials (for example, silicon based non-oxides, such as SiC—SiC Ceramic Matrix Composites) inside the combustion stream of a hot section in the engine due to silicon hydroxide species (SiOH) formation with water molecules formed during combustion processes. Doping the fuel with silicon generates SiOH species in the flow path and saturates the flow field with the molecule, thus retarding the rate of reaction (the driving force) with ceramic components exposed to the flow path. The amount of silicon doping required by the flow path section is proportional to several engine parameters, and as such, can be varied during operation to better use the dopant, which is not recognized in U.S. Pat. No. 6,517,341.

FIG. 1 illustrates an exemplary but non-limiting system that includes a gas turbine engine 10 with a compressor 12, a combustion chamber 14, a turbine 16, and a generator 18. The gas turbine engine 10 runs on a combustible fuel delivered through a fuel line 20. A fuel delivery circuit 22 may contain several lines (fuel, purge air, etc), but is illustrated with a minimal number of lines for simplicity. One of the lines going into the combustion chamber 14, a silicon injection line 24, may be dedicated to inject silicon mixed with an organic compound (for example, siloxanes, silanes, silica, silicones, silicon carbides, silicon nitrides, silicon oxides, silicates, sand, and mixtures thereof) in liquid form into the combustion system. Injection of silicon can be introduced anywhere as appropriate based upon the needs of the system, for example, fuel nozzles or downstream of the flame. If the gas turbine engine 10 is running on liquid fuels, silicon can be introduced by mixing the silicon directly with the distillate fuel being introduced into the machine. However, injecting the silicon separately from the liquid fuel may provide for relatively superior control of the silicon and therefore may be more finely tuned.

The silicon injection line 24 may be connected to an accessory skid (not illustrated) which contains a pump 26 connected to a silicon doping fluid tank 28 and has controls 30, 32 to control the fuel flow and/or silicon into the combustion chamber 14. For example, the controls 30, 32 may be in the form of valves (as illustrated), a variable frequency drive motor that drives the pump 26 and/or a similar pump (not illustrated) associated with the fuel line 20. The controls 30, 32 and pump 26 may receive controlling input from a main gas turbine control unit 34, which may include sensors or control lines from sensors read several variables that are deemed controlling in the recession rates for ceramic parts inside the turbine engine.

Figure 2:
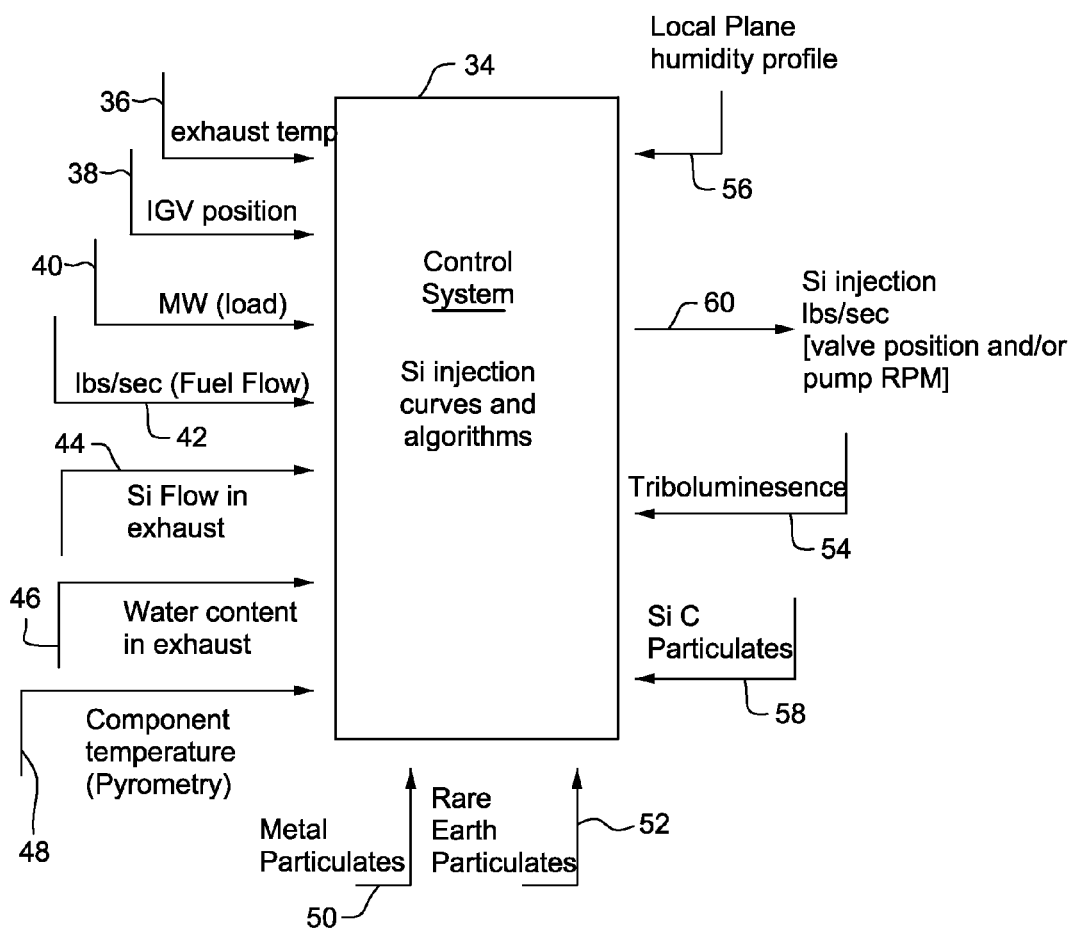
FIG. 2 is an exemplary but non-limiting diagram showing control signals that may be used to control silicon injection in a gas turbine engine.

FIG. 2 illustrates signals that may be sent to or from the main gas turbine control unit 34 or other inputs that may serve as a basis for control. For example the signals may be representative of temperature of turbine exhaust gas 36, inlet guide vane position 38, turbine load 40, fuel flow 42, silicon or silicon hydroxide content 44 of the turbine exhaust gas, water content 46 of the turbine exhaust gas, component temperature 48 of the turbine exhaust gas, metal particulates 50 in the turbine exhaust gas, rare earth particulates 52 in the turbine exhaust gas, triboluminescence events 54 associated with the gas turbine engine, local humidity at an inlet plane 56 of the gas turbine engine, and ceramic particles 58 in the turbine exhaust gas. The signals may be generated based upon measurements, estimates and/or predictions. The estimates and/or predictions may be based upon a model. A resulting output signal 60 may control an injection rate of silicon, which may be measured in any convenient way. For example, pounds per second or parts per million may be used to measure silicon injection rate. The output signal 60 may represent a correlation between one or more of the preceding variables, or other variables, and an effective amount of silicon to be injected into the gas turbine engine 10. An effective amount could be a flow rate and/or a bulk addition of silicon. The output signal 60 may be correlated continuously or periodically during operation of the gas turbine engine 10.

The variables may relate to the gas flow of the engine (inlet guide vane angle position and compressor speed), the temperature in the flow path (exhaust temperature sensors, fuel flow into the combustion system, pyrometer temperature readings), the amount of hydrogen or water present in the flow path (fuel flow, steam injection, type of fuel used) or the amount of ceramic material being degraded in the engine (silicon sensors in the exhaust of the engine system). All these sensors may work in unison with or be part of the main gas turbine control unit 34, where an amount of silicon (or other dopant) required to avoid recession (or slow it down) is calculated and a signal is sent to control the silicon flow into the gas turbine engine 10 via a valve position on control 32 or a speed setting on the pump 26. With an effective amount of silicon (or other dopant) in the system, the ceramic components in the turbine section will not experience recession and thus can operate in a more efficient manner.

As illustrated throughout various figures discussed in detail below, the amount of silicon injected may be limited or bounded by a maximum amount that, in exemplary but non-limiting examples, is not exceeded. For example, the maximum amount of silicon that is injected may be determined so that the injected silicon does not have any detrimental effect on the combustion processes or other processes in the gas turbine engine 10. For example, the amount of silicon injected could be limited such that the efficiency of the engine is not substantially degraded or is not measurably degraded. The amount of silicon injected may be determined based upon turbine clogging. In another example, the amount of silicon injected could be limited based upon the ability of the gas turbine engine 10 to meet particulate emission requirements, which may be variable based upon the system provided for removing particulates (e.g., filter vs. electrostatic removal) and/or may be variable based upon how operating parameters of the gas turbine engine 10 interact with a given particulate removal system. The maximum amount could be a fixed, predetermined amount or the maximum amount could be variable based upon operating conditions of the gas turbine engine 10 that are continuously or periodically monitored. If the effective amount of silicon necessary to control volatilization exceeds the maximum amount, the lower of the two amounts may be injected to provide some level of volatilization control without degrading the output, such as emissions, performance or efficiency, of the gas turbine engine 10.

Figure 3:
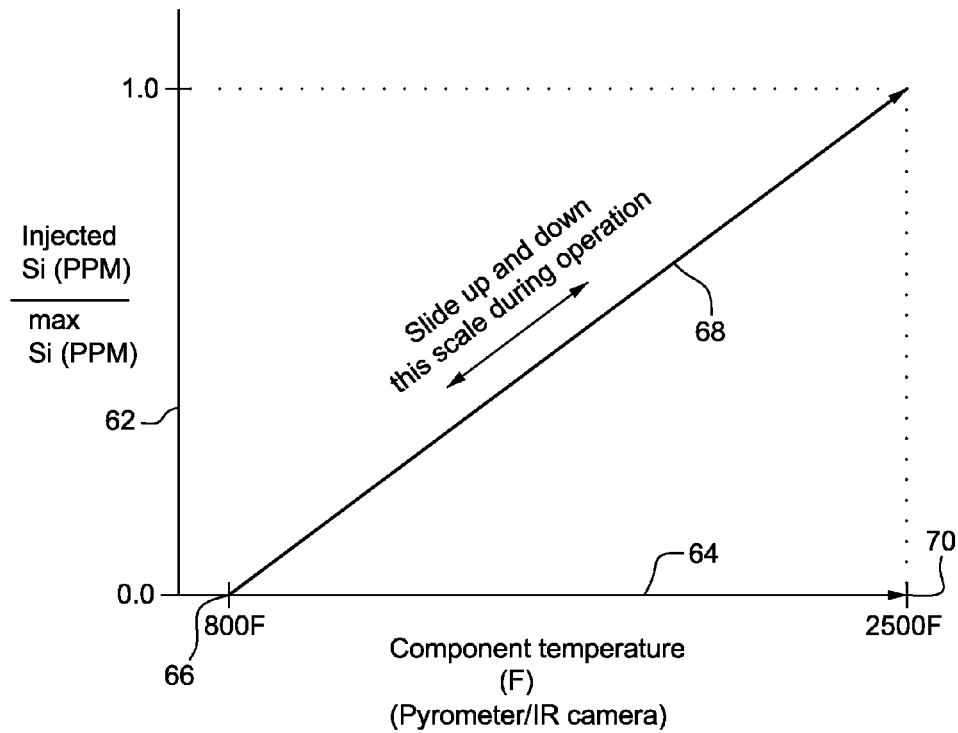
FIGS. 3-10 are exemplary but non-limiting graphical representations of relationships between silicon injection and one or more measured, estimated and/or predicted variables.

FIG. 3 illustrates a relationship between silicon injection and component temperature. The vertical axis 62 is a dimensionless variable of injected silicon divided by maximum silicon, both of which are illustrated as parts per million (PPM) but could be measured in any other suitable dimension or unit. The horizontal axis 64 has units of temperature, such as degrees Fahrenheit. FIG. 3 illustrates a two-piece-linear relationship between silicon injection and component temperature. Below a predetermined component temperature 66, illustrated as an exemplary but non-limiting value of 800 degrees Fahrenheit, there is no silicon injection. Above the predetermined component temperature 66, there is a linearly increasing relationship 68 between component temperature and silicon injection, which stops when the vertical axis 62 reaches unity (1.0), which corresponds to a second predetermined component temperature 70, illustrated as an exemplary but non-limiting value of 2500 degrees Fahrenheit. Although the component temperature may correspond to any location on the component, it may be more beneficial to measure a location of the component that reaches, or is likely to reach, a highest temperature. Such a location is likely to be on a forward face of the component with respect to turbine flow. The component temperature can be measured by way of pyrometry for example, or could be measured or estimated using other known techniques.

Figure 4:
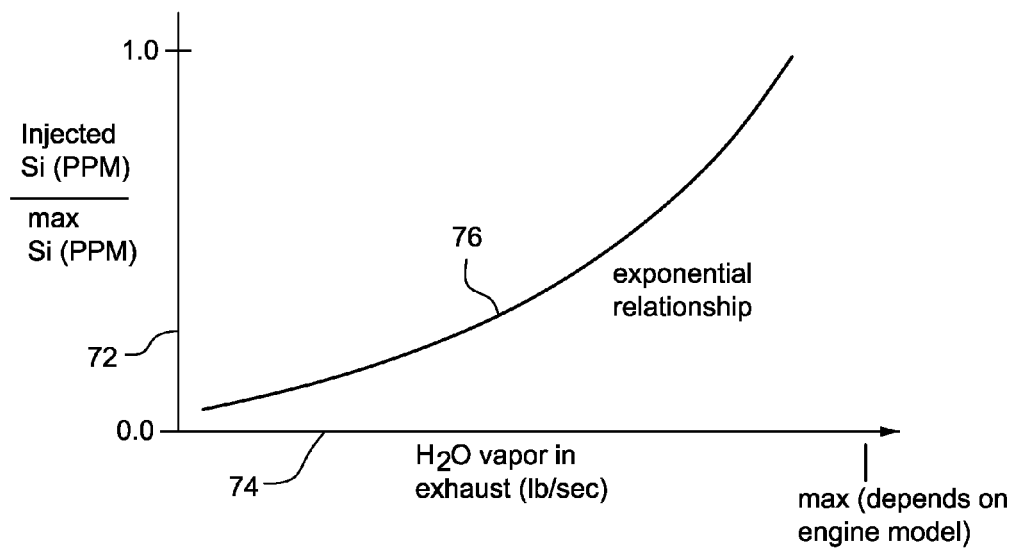

FIG. 4 illustrates a relationship between silicon injection and water content of the turbine exhaust. The vertical axis 72 is a dimensionless variable of injected silicon divided by maximum silicon, both of which are illustrated as parts per million (PPM) but could be measured in any other suitable dimension or unit. The horizontal axis 74 includes units suitable for measurement of water content, such as pounds per second. FIG. 4 illustrates an exponential relationship 76 between silicon injection and water content, which stops when the vertical axis 72 reaches unity (1.0). No specific values of water content are illustrated because the water content values will vary at least by type of turbine engine. For example, the total surface area of ceramic components may vary between types and models of turbine engines, which may result in different values of water content.

Figure 5:
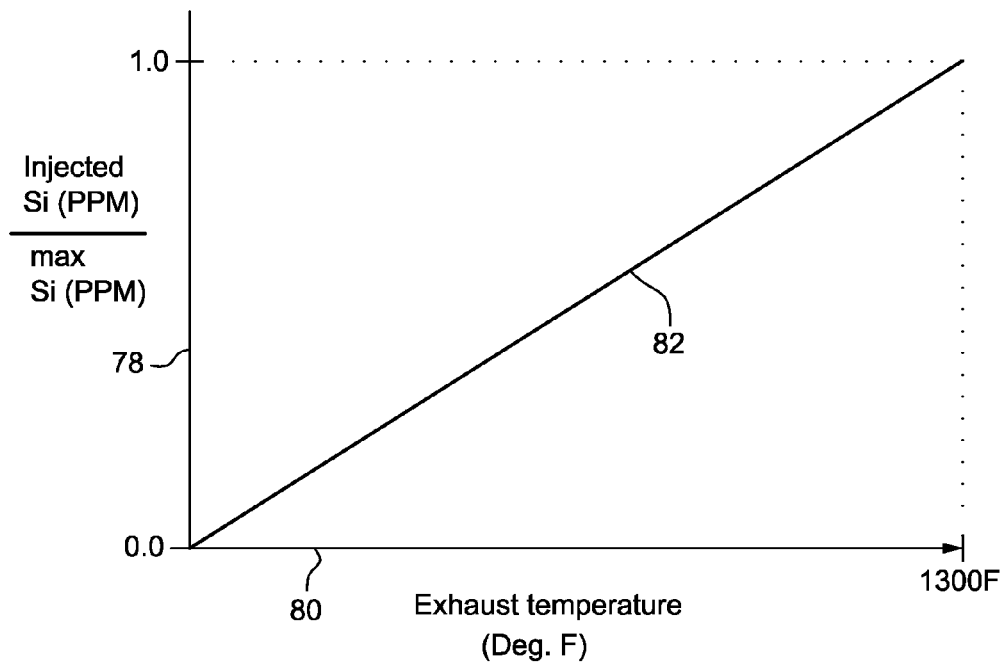

FIG. 5 illustrates a relationship between silicon injection and temperature of the turbine exhaust gas. The vertical axis 78 is a dimensionless variable of injected silicon divided by maximum silicon, both of which are illustrated as parts per million (PPM) but could be measured in any other suitable dimension or unit. The horizontal axis 80 has units of temperature, such as degrees Fahrenheit. FIG. 5 illustrates a linear relationship 82 between silicon injection and component temperature. A value of unity (1.0) for silicon injection will correspond to a predetermined temperature that may vary based upon parameters of the gas turbine engine 10 (e.g., based upon the design of the turbine), and is illustrated in an exemplary but non-limiting manner as 1300 degrees Fahrenheit.

Figure 6:
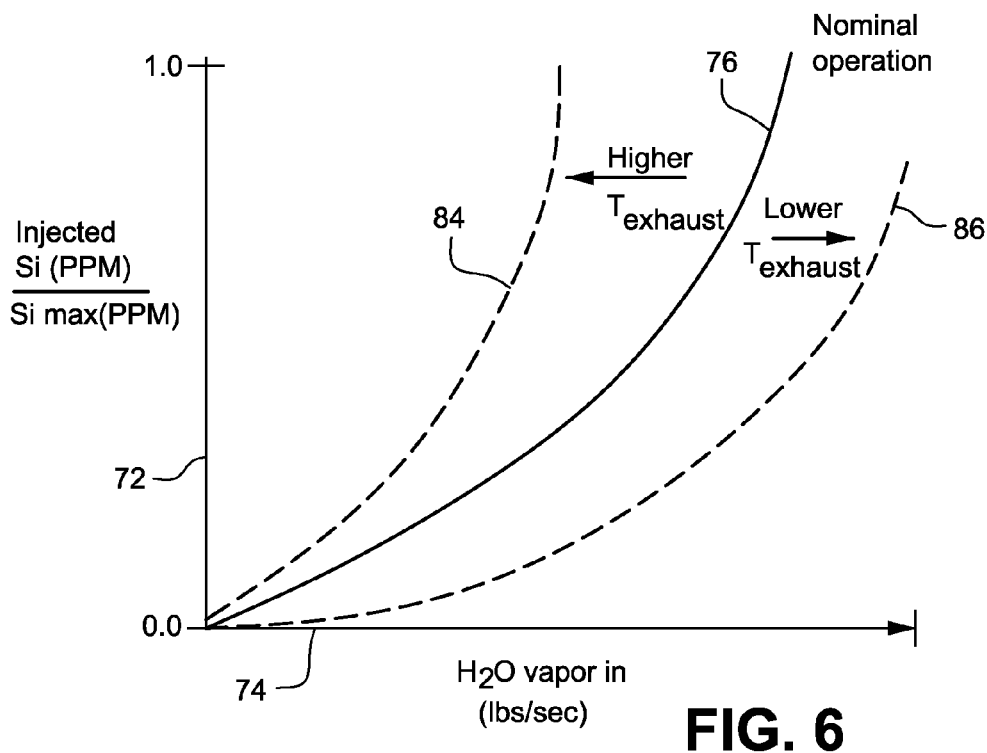

FIG. 6 illustrates another relationship between silicon injection and water content of the turbine exhaust. FIG. 6 has similarities to FIG. 4 and therefore description of identical reference numbers is omitted. FIG. 5 further illustrates that the exponential relationship between silicon injection and water content can be varied based upon another variable. In an exemplary but non-limiting example, the other variable could be exhaust temperature. The exponential relationship 76 corresponds to a normal or nominal condition of the other variable. The exponential relationship 76 can be shifted based upon a value of the other variable. For example, if the other variable increases, the exponential relationship 76 can shift to the left to a second exponential relationship 84, and if the other variable decreases, the exponential relationship 76 can shift to the right to a third exponential relationship 86. For example, as exhaust temperature increases, the exponential relationship between silicon injection and water content of the turbine exhaust may increase such that more silicon is injected for a given amount of water content, and as exhaust temperature decreases, the opposite may occur. Thus, FIG. 6 also shows the general proposition that there is interaction between the variables and their respective influence on silicon injection.

Figure 7:
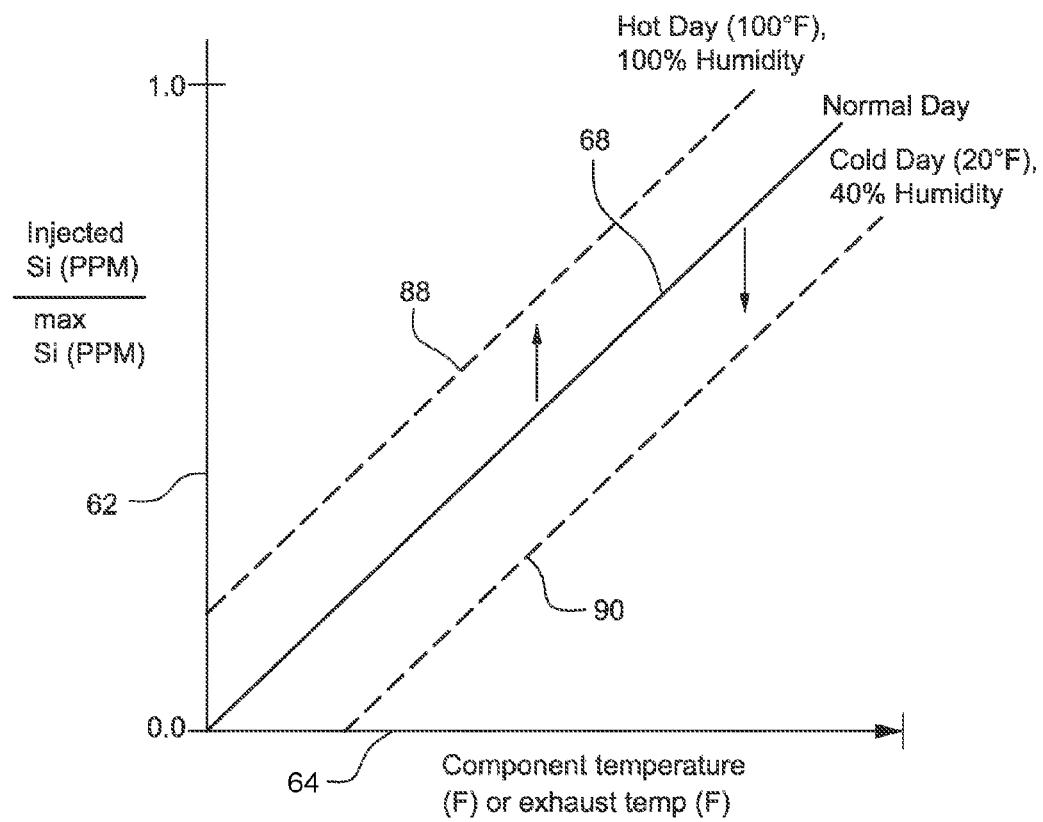

FIG. 7 illustrates another relationship between silicon injection and component temperature similar to FIG. 3. Similar to FIG. 6, FIG. 7 illustrates how a relationship can be varied based upon another variable. Here, the linear relationship 68 can be shifted based upon another variable. For example, if the other variable increases, the linear relationship 68 may shift up to a second linear relationship 88, and if the other variable decreases, the linear relationship may shift down to a third linear relationship 90. For example, as ambient temperature increases, the linear relationship between silicon injection and component temperature may shift up such that more silicon is injected for a given component temperature and if ambient temperature decreases, the opposite may occur. Thus, FIG. 7 also shows the general proposition that there is interaction between the variables and ambient conditions.

Figure 8:
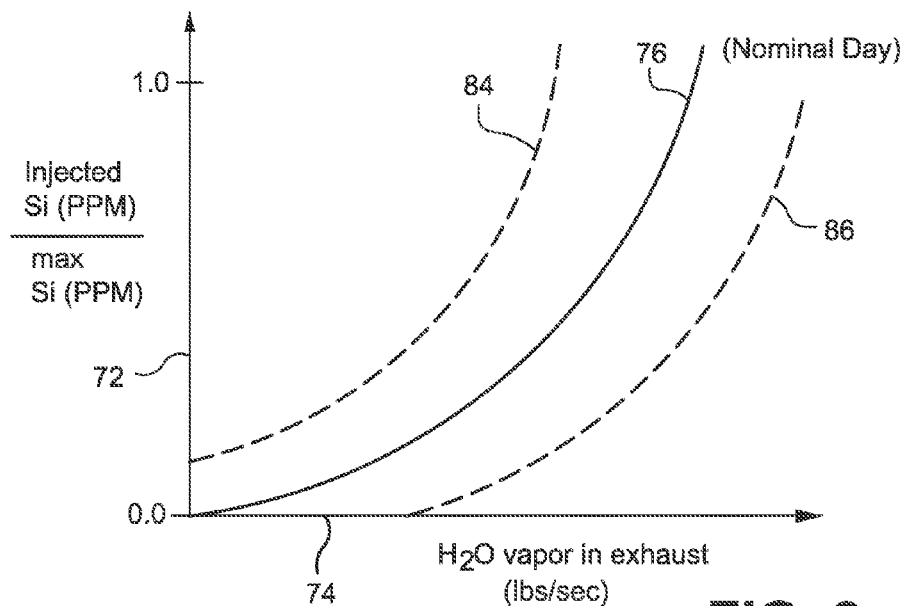

FIG. 8 is similar to FIGS. 4 and 6 in that a relationship between silicon injection and water content of the turbine exhaust is illustrated, but is more general in that the exponential relationship 76 is based upon a nominal day (temperature, pressure, humidity, etc.) whereas the second exponential relationship 84 and third exponential relationship 86 illustrate deviations from a nominal day.

Figure 9:
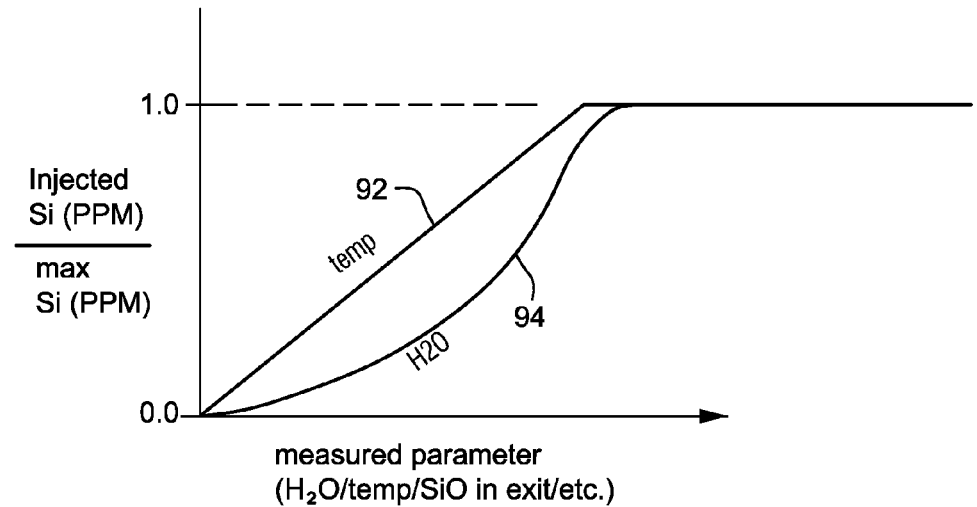

FIG. 9 illustrates how different variables may still be limited by the same maximum amount of silicon injection. FIG. 9 includes a relationship 92 for temperature and second relationship 94 for water, but both share the same limit for maximum injection of silicon. Thus, FIG. 9 makes clear that the maximum amount of silicon to be injected remains the same across the measured parameters.

Figure 10:
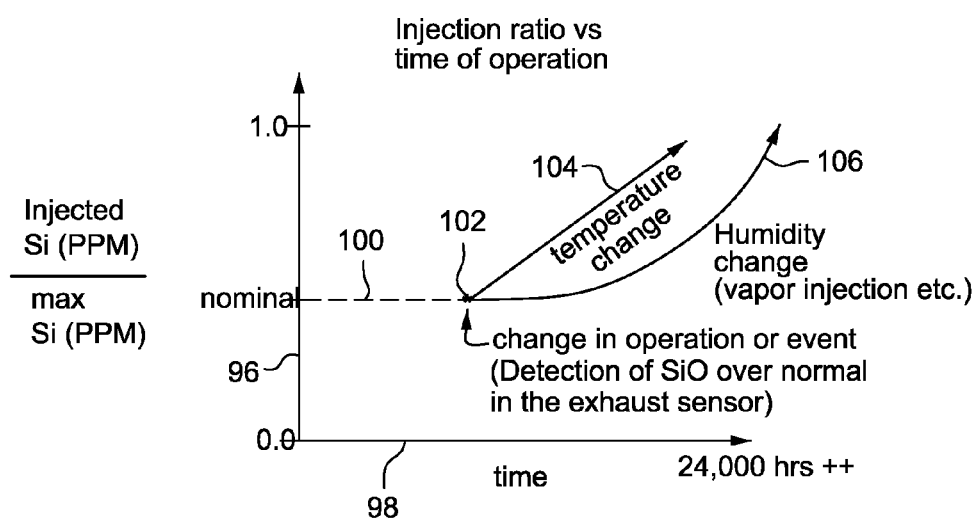

FIG. 10 illustrates a relationship between silicon injection and operating time. The vertical axis 96 is a dimensionless variable of injected silicon divided by maximum silicon, both of which are illustrated as parts per million (PPM) but could be measured in any other suitable dimension or unit. The horizontal axis 98 has units of time, such as operating hours. Under normal operation and/or initial operation, a fixed amount 100 of silicon can be injected. After reaching some predetermined event 102 or change in operation, the amount of silicon injection may change. The predetermined event 102 could be any predetermined event that warrants a change in silicon injection. For example, after a predetermined operating time of the combustion turbine engine 10, the amount of silicon injection could be increased because, for example, the amount of volatilization has reached a level that requires additional silicon. In another example, a predetermined event 102 could be detected that warrants increased injection. For example, particles in the exhaust, which are indicative of an event such as, for example, a collision, may warrant increased volatilization control through increased silicon injection. Exemplary but non-limiting particles may include metal particles, rare earth particles, and/or ceramic particles. Also, the predetermined event 102 could be a temperature change such that above a certain temperature, a linear relationship 104 of increasing silicon injection may be applied. Alternatively, the predetermined event 102 could be humidity change such that above a certain humidity, an exponential relationship 106 of increasing silicon injection may be applied. FIG. 10 may be viewed for the general proposition that after a predetermined event, there is a new correlation or re-correlation between silicon injection and a measured, estimated and/or predicted variable.

Based upon the discussion above, two general equations may be used to determine silicon injection. Both equations can be used to determine an effective amount of silicon to be injected.

In a first equation, a coefficient for each measured, estimated and/or predicted variable or parameter is multiplied times a base amount of silicon injection to arrive at an actual amount of silicon injected: $Si_{effective}=Si_{base}(C_1)(C_2)\ldots(C_n)$, where $Si_{effective}$ is the effective amount of silicon, $SL_{base}$ is a starting amount of silicon to be injected, and $C_n$ is a coefficient that is based upon or correlated to each measured parameter.

In a second equation, an amount of silicon is determined for each variable or parameter, and the sum is injected: $Si_{effective}=\Sigma(Si_1C_1+S_2C_2+\ldots+Si_nC_n)$, where $Si_{effective}$ is the effective amount of silicon, $Si_n$ is a starting amount of silicon for a given parameter, and $C_n$ is a coefficient that is based upon or correlated to each measured parameter.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of controlling volatilization of silicon based components in a gas turbine engine, the method comprising:
   measuring, estimating and/or predicting a variable related to operation of the gas turbine engine;
   correlating the variable to determine an effective amount of silicon to control volatilization of the silicon based components in the gas turbine engine;
   comparing the effective amount of silicon to a maximum amount of silicon; and
   injecting the lesser of the effective amount of silicon and the maximum amount of silicon into the gas turbine engine to control volatilization of the silicon based components.

2. The method according to claim 1, wherein the variable comprises at least one of temperature of turbine exhaust gas, inlet guide vane position, turbine load, fuel flow, silicon or silicon hydroxide content of the turbine exhaust gas, water content of the turbine exhaust gas, a component temperature of the gas turbine engine, metal particulates in the turbine exhaust gas, rare earth particulates in the turbine exhaust gas, triboluminescence events associated with the gas turbine engine, ceramic particles in the turbine exhaust gas, and local humidity at an inlet plane of the gas turbine engine.

3. The method according to claim 1, wherein the effective amount of silicon is re-correlated periodically or continuously during operation of the gas turbine engine.

4. The method according to claim 1, wherein temperature of turbine exhaust gas, fuel flow, water content of the turbine exhaust gas and a component temperature of the gas turbine engine are each measured and correlated to determine the effective amount of silicon.

5. The method according to claim 1, wherein the variable is a component temperature of the gas turbine and the correlation has a linear relationship between the effective amount of silicon and the component temperature of the gas turbine.

6. The method according to claim 5, wherein the effective amount of silicon is zero when the component temperature is at or below a predetermined temperature and increases linearly when the component temperature is above the predetermined temperature.

7. The method according to claim 6, wherein the predetermined temperature is 800 degrees Fahrenheit.

8. The method according to claim 1, wherein the variable is water content of the turbine exhaust gas and the correlation has an exponential relationship between the effective amount of silicon and the water content.

9. The method according to claim 8, wherein the exponential relationship is adjusted based upon another measured, estimated and/or predicted variable.

10. The method according to claim 1, wherein the variable is temperature of the turbine exhaust gas and the correlation has a linear relationship between the effective amount of silicon and the temperature of the turbine exhaust gas.

11. The method according to claim 1, wherein the variable is correlated based upon ambient conditions external to the gas turbine engine in addition to the variable.

12. The method according to claim 1, wherein the maximum amount of silicon is a maximum amount of silicon that can be injected into the gas turbine engine without exceeding particulate emission requirements.

13. The method according to claim 12, wherein the maximum amount of silicon is variable.

14. The method according to claim 1, wherein the maximum amount of silicon is predetermined based upon parameters of the gas turbine engine.

15. The method according to claim 1, wherein the effective amount of silicon is fixed amount until a predetermined operational event of the gas turbine engine occurs.

16. The method according to claim 15, wherein the predetermined operational event is a non-zero cumulative operating duration of the gas turbine engine.

17. The method according to claim 15, wherein the predetermined operational event is detecting an impact event in the gas turbine engine.

18. The method according to claim 17, wherein the impact event is detected by detecting at least one of a silicon carbide particulate in the turbine exhaust gas, a metal particulate in the turbine exhaust gas, a rare earth particulate in the turbine exhaust gas, and a triboluminescence event.

19. A method of controlling volatilization of silicon based components in a gas turbine engine, the method comprising:
measuring temperature of turbine exhaust gas, fuel flow, water content of the turbine exhaust gas, and a component temperature of the gas turbine engine;
correlating each of the temperature of the turbine exhaust gas, the fuel flow, the water content and the component temperature to determine an effective amount of silicon to control volatilization of the silicon based components in the gas turbine engine; and
injecting the effective amount of silicon into the gas turbine engine to control volatilization of the silicon based components.

20. A gas turbine engine system comprising:
a compressor;
a combustion system;
a turbine section;
an injector adapted to inject silicon into the combustion system; and
a controller, wherein the controller includes programming for:
measuring, estimating and/or predicting a variable related to operation of the gas turbine engine;
correlating the variable to determine an effective amount of silicon to control volatilization of silicon based components in the gas turbine engine;
comparing the effective amount of silicon to a maximum amount of silicon; and
injecting the lesser of the effective amount of silicon and the maximum amount of silicon into the gas turbine engine to control volatilization of the silicon based components.

* * * * *

UNITED STATES PATENT AND TRADEMARK OFFICE
CERTIFICATE OF CORRECTION

PATENT NO. : 9,435,268 B2
APPLICATION NO. : 14/222927
DATED : September 6, 2016
INVENTOR(S) : Garcia-Crespo et al.

It is certified that error appears in the above-identified patent and that said Letters Patent is hereby corrected as shown below:

In The Specification

Column 1, line 26, change "Environmental Bather Coatings" to --Environmental Barrier Coatings--

Column 7, line 64, change "$SL_{base}$" to --$Si_{base}$--

Column 8, line 3, change "$\Sigma(Si_1C_1 + S_2C_2 +...+ Si_nC_n)$" to --$\Sigma(Si_1C_1 + Si_2C_2 +...+ Si_nC_n)$--

Signed and Sealed this
Twenty-ninth Day of November, 2016

Michelle K. Lee
*Director of the United States Patent and Trademark Office*